(12) United States Patent
Tanoi

(10) Patent No.: US 6,441,841 B1
(45) Date of Patent: Aug. 27, 2002

(54) PICTURE COMBINING TECHNIQUE IN MULTIPOINT CONTROL UNIT

(75) Inventor: Toshiyuki Tanoi, Tokyo (JP)

(73) Assignee: NEC Corporation, Tokyo (JP)

( * ) Notice: Subject to any disclaimer, the term of this patent is extended or adjusted under 35 U.S.C. 154(b) by 48 days.

(21) Appl. No.: 09/645,495

(22) Filed: Aug. 25, 2000

(30) Foreign Application Priority Data

Aug. 25, 1999 (JP) ............................................ 11-237694

(51) Int. Cl.$^7$ ................................................ H04N 7/14
(52) U.S. Cl. .............................. 348/14.07; 348/14.08; 348/14.09
(58) Field of Search .......................... 348/14.08, 14.09, 348/14.1, 14.11, 14.12, 14.13, 14.14, 14.01, 14.04, 14.07; 370/260, 261; 709/204, 205; H04N 7/14

(56) References Cited

U.S. PATENT DOCUMENTS 5,453,780 A * 9/1995 Chen et al. .............. 348/14.11

* cited by examiner

*Primary Examiner*—Melur. Ramakrishnaiah
(74) *Attorney, Agent, or Firm*—McGinn & Gibb, PLLC

(57) ABSTRACT

A combined picture data generating apparatus allowing the dramatically reduced amount of hardware of a multipoint control unit for a videoconference system is disclosed. An intra-frame coding picture is extracted from each of terminal picture data signals received from videoconference terminals. Intra-frame coding pictures extracted from the terminal picture data signals are combined to produce a combined picture data signal providing each of the videoconference terminals with a partitioned display screen having separate portions corresponding to respective ones of the videoconference terminals.

10 Claims, 5 Drawing Sheets

DISPLAY SCREEN
PARTITIONED INTO
4 PORTIONS
(STILL PICTURE)

PICTURE COMBINING TECHNIQUE IN MULTIPOINT CONTROL UNIT

BACKGROUND OF THE INVENTION

1. Field of the Invention

The present invention generally relates to a multipoint videoconference system, and in particular to a picture combining method and apparatus in a multipoint control unit for use in the multi-point videoconference system.

2. Description of the Related Art

A multipoint videoconference system performs multipoint teleconferencing using the ITU-T H.261 "Video Codec for Audiovisual Services at p×64 kbit/s" standards and the narrow band ISDN (Integrated Services Digital Network) channels for signal transmission. The multipoint videoconference system includes a multipoint control unit and a plurality of videoconference terminals, which are individually located in the places and are connected to one another, for example, through the ISDN network.

In such a multipoint videoconference system, the multipoint control unit receives terminal picture data signals from the videoconference terminals through the ISDN network and provides a combined picture data signal to each of the videoconference terminals through the ISDN network. Each of the videoconference terminals displays a combined picture including a plurality of divisional pictures by the use of a split screen technique in response to the combined picture data signal.

A conventional multipoint control unit is provided with a plurality of decoders individually corresponding to the videoconference terminals, which decodes terminal picture data signals received from the videoconference terminals to produce decoded terminal picture signals according to H.261 "Video Codec for Audiovisual Services at p×64 kbit/s".

However, the conventional multipoint control unit must carry out the decoding of terminal picture data signals received from the videoconference terminals to produce the combined picture data signal. Therefore, it is necessary to provide the multipoint control unit with as many decoders as the videoconference terminals, resulting in the increased amount of hardware.

SUMMARY OF THE INVENTION

An object of the present invention is to provide a picture combining method and apparatus allowing the amount of hardware of a multipoint control unit to be reduced.

Another object of the present invention is to provide a picture combining method allowing simplified picture combining.

According to the present invention, an apparatus for generating a combined picture data signal in a multipoint control unit of a videoconference system having a plurality of videoconference terminals, wherein the combined picture data signal provides each of the videoconference terminals with a partitioned display screen having separate portions corresponding to respective ones of the videoconference terminals, includes: an extractor for extracting an intra-frame coding picture from each of terminal picture data signals received from the videoconference terminals; and a combiner for combining intra-frame coding pictures extracted from the terminal picture data signals to produce the combined picture data signal.

The extractor may include an intra-frame separator for separating an intra-frame coding picture from each of the terminal picture data signals by detecting a picture frame followed by the intra-frame coding picture from the terminal picture data signal; and a frame memory for storing the intra-frame coding picture, which is updated every time a picture frame is detected.

The combiner may include: a header separator for separating each of the terminal picture data signals into an intra-frame video data and header data; a header generator for generating combined header data based on header data of the terminal picture data signals; and a multiplexer for multiplexing intra-frame video data of the terminal picture data signals and the combined header data to produce the combined picture data signal.

Each of the videoconference terminals may conform to ITU-T H.320 standard (Narrow-band Visual Telephone Systems and Terminal Equipment). The intra-frame coding picture may be a frame of QCIF (Quarter Common Intermediate Format) video data.

According to another aspect of the present invention, a method for generating a combined picture data signal in a multipoint control unit of a videoconference system having a plurality of videoconference terminals, has the steps of: a) extracting an intra-frame coding picture from each of terminal picture data signals received from the videoconference terminals; and b) combining intra-frame coding pictures extracted from the terminal picture data signals to produce the combined picture data signal.

As described above, only an intra-frame coding picture is extracted from each of the terminal picture data signals received from the videoconference terminals. Therefore, a frame of combined picture data can be formed from the intra-frame coding picture without the need of H.261 video data decoders conforming to H.261 (Video codecs for audiovisual services at p×64 Kbps), resulting in dramatically reduced amount of circuit hardware in the multipoint control unit. Since only intra frames are used, smoothly moving picture cannot be displayed but still pictures, each of which is divided into portions corresponding to individual videoconference terminals on each vldeoconference terminal.

DETAILED DESCRIPTION OF THE PREFERRED EMBODIMENT

A preferred embodiment of the present invention will be described hereafter.

Figure 1:
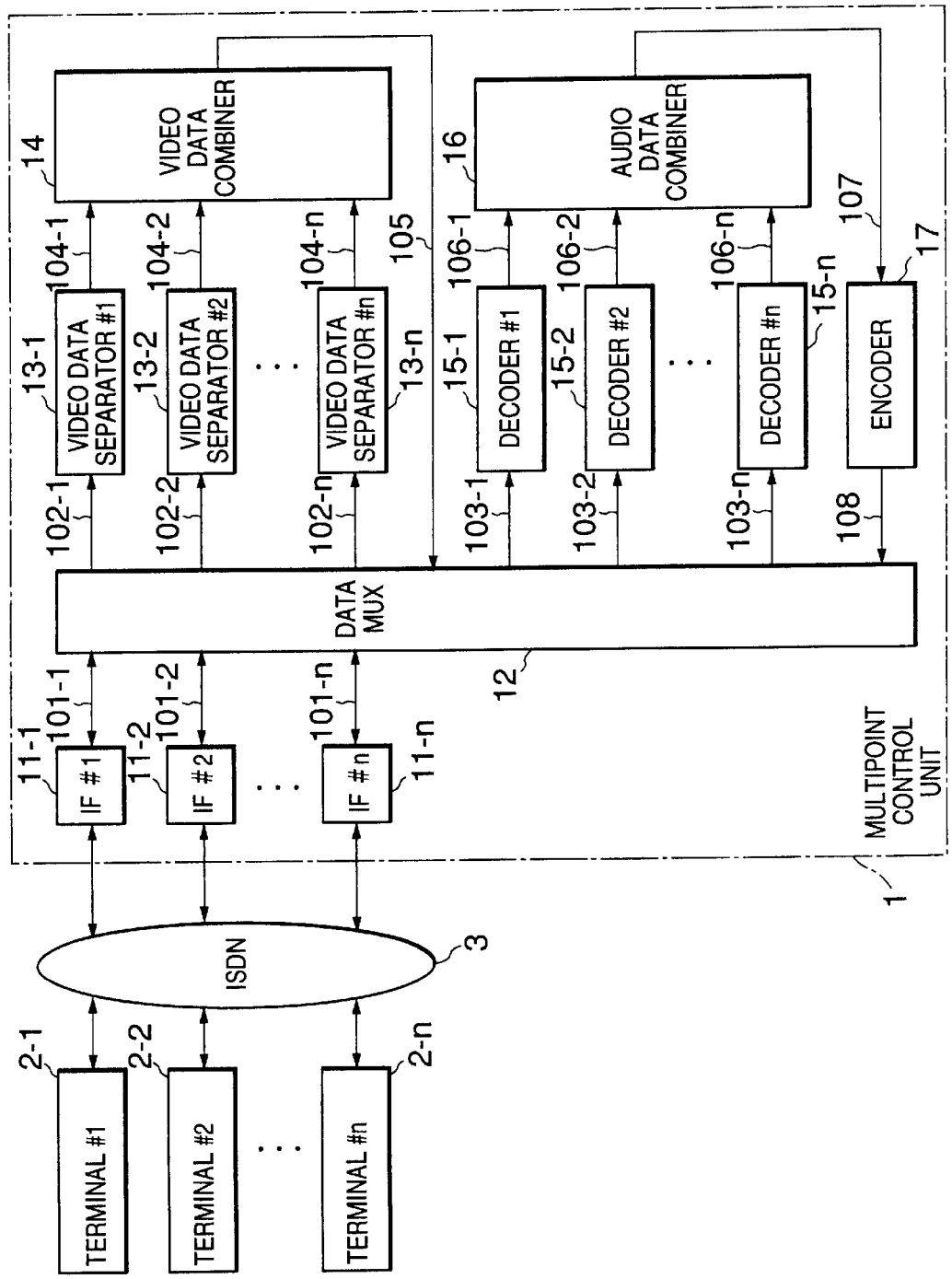
FIG. 1 is a block diagram showing a circuit configuration of a multipoint control unit according to an embodiment of the present invention.

As shown in FIG. 1, a multipoint videoconference system is composed of a multipoint control unit 1 and n (n is an integer) videoconference terminals 2-1 through 2-n, which are connected to the multipoint control unit 1 through an ISDN public network 3. Each of the videoconference terminals 2-1 through 2-n conforms to ITU-T H.320 "Narrowband Visual Telephone Systems and Terminal Equipment" and uses the coding mode of QCIF (Quarter Common Intermediate Format).

The multipoint control unit 1 includes n line interface circuits 11-1 through 11-n, a H.221 data multiplexer/demultiplexer (MUX) 12, n H.261 video data separators 13-1 through 13-n, a H.261 video data combiner 14, n audio data decoders 15-1 through 15-n, an audio data combiner 16, and an audio data encoder 17.

The line interface circuits 11-1 through 11-n connect the ISDN network 3 and the H.221 data MUX 12, corresponding to the n videoconference terminals 2-1 through 2-n, respectively. The respective line interface circuits 11-1 through 11-n terminate line data for the videoconference terminals 2-1 through 2-n and output H.221 received data to the H.221 data MUX 12. Contrarily, H.221 transmission data output are output from the H.221 data MUX 12 to the line interface circuits 11-1 through 11-n, through which they are transmitted to corresponding videoconference terminals 2-1 through 2-n, respectively.

The H.221 data MUX 12 detects H.221 frame sync signals from the H.221 received data and demultiplexes the H.221 received data into video data 102-1 through 102-n and audio data 103-1 through 103-n. Contrarily, the H.221 data MUX 12 multiplexes combined video data 105 and encoded combined audio data 108 into a H.221 transmission data 101-1 through 101-n and distributes it to the videoconference terminals 2-1 through 2-n via the line interface circuits 11-1 through 11-n. respectively.

Further, the H.221 data MUX 12 also has a switching function of switching audiovisual data received from each of the videoconference terminals 2-1 through 2-n. The details of the switching function are described in ITU-T H.231 "Multipoint Control Units for Audiovisual systems using digital channels up to 2 Mbits/s".

The H.261 video data separators 13-1 through 13-n first perform error-correcting decoding of the video data 102-1 through 102-n, respectively. Thereafter, each of the H.261 video data separators 13-1 through 13-n detects an Intra-frame coding Picture from corresponding video data and separates intra frames, of QCIF (Quarter Common Intermediate Format) video data from the corresponding video data. In this manner, the respective H.261 video data separators 13-1 through 13-n output n frames of QCIF video data 104-1 through 104-n to the video data combiner 14.

The video data combiner 14 combines the frames of QCIF video data 104-1 through 104-n into a frame of CIF (Common Intermediate Format) video data and attaches it with a combined header to produce the H.261 video data 105 after error-correcting encoding thereon.

The audio data decoder 15-1 through 15-n decode the audio data 103-1 through 103-n to produce decoded audio data 106-1 through 106-n, respectively. The audio data combiner 16 combines the decoded audio data 106-1 through 106-n to produce combined audio data 107. The combined audio data 107 is encoded by the audio data encoder 17 to output encoded audio data 108 to the data MUX 12. The details regarding this audio processing are described in ITU-T H.231 standards.

The H.261 video data separators 13-1 through 13-n has the same circuit configuration. Taking the H.261 video data separators 13-1 as an example, the details will be described with reference to FIG. 2.

Figure 2:
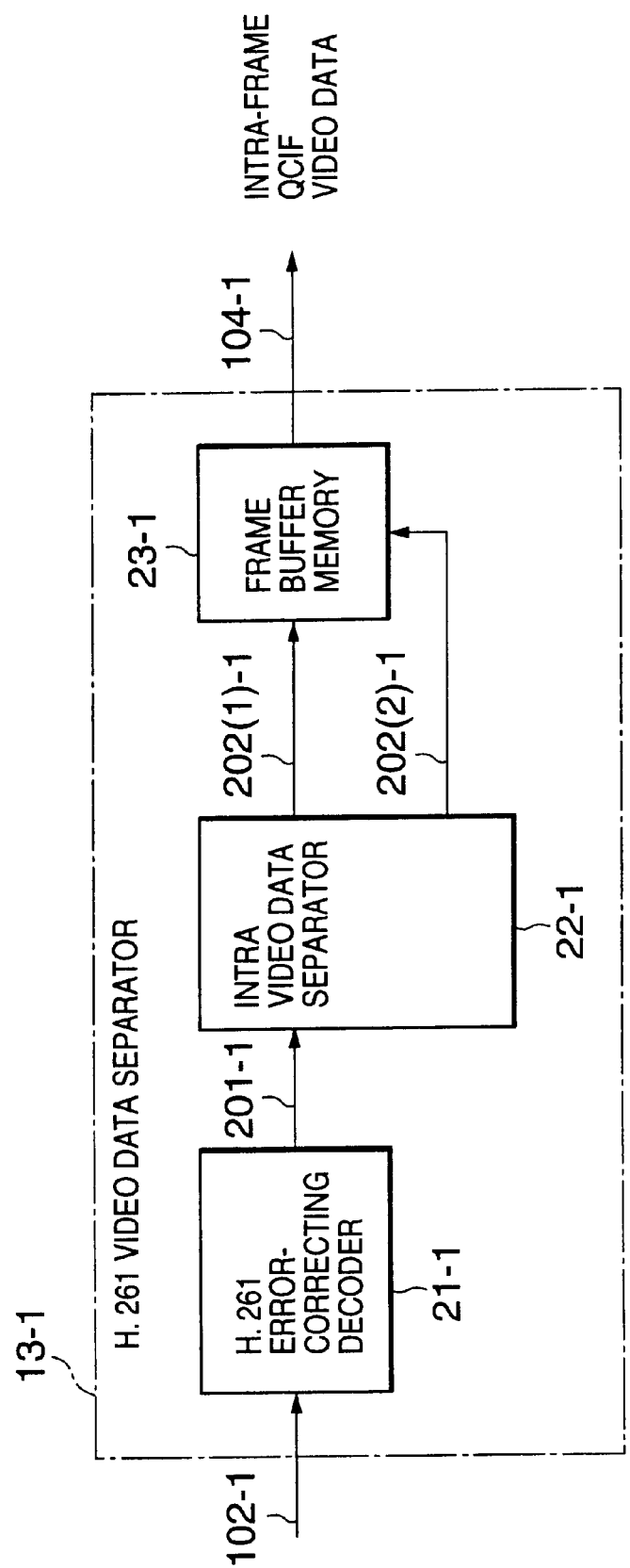
FIG. 2 is a block diagram showing a video data separator used in the embodiment.

As shown in FIG. 2, the H.261 video data separators 13-1 includes H.261 error-correcting decoder 21-1, an intra-video data separator 22-1, and a frame buffer memory 23-1. The H.261 error-correcting decoder 21-1 performs BCH (Bose Chaudhuri Hocquenghem) error-correction decoding of the video data 102-1 to produce decoded video data 201-1.

The intra-video data separator 22-1 detects a picture header from the decoded video data 201-1 and separates intra-QCIF video data 202(1)-1 from the decoded video data 201-1 and produces a frame memory update signal 202(2)-1. A frame of intra-QCIF video data 202(1)-1 is stored into the frame buffer memory 23-1 according to the frame memory update signal 202(2)-1. In other words, the frame buffer memory 23-1 is updated according to the frame memory update signal 202(2)-1. The frame of intra-QCIF video data stored in the frame buffer memory 23-1 is output as QCIF video data 104-1 to the bide data combiner 14. It is the same with the other 261 video data separators 13-2 through 13-n.

Figure 3:
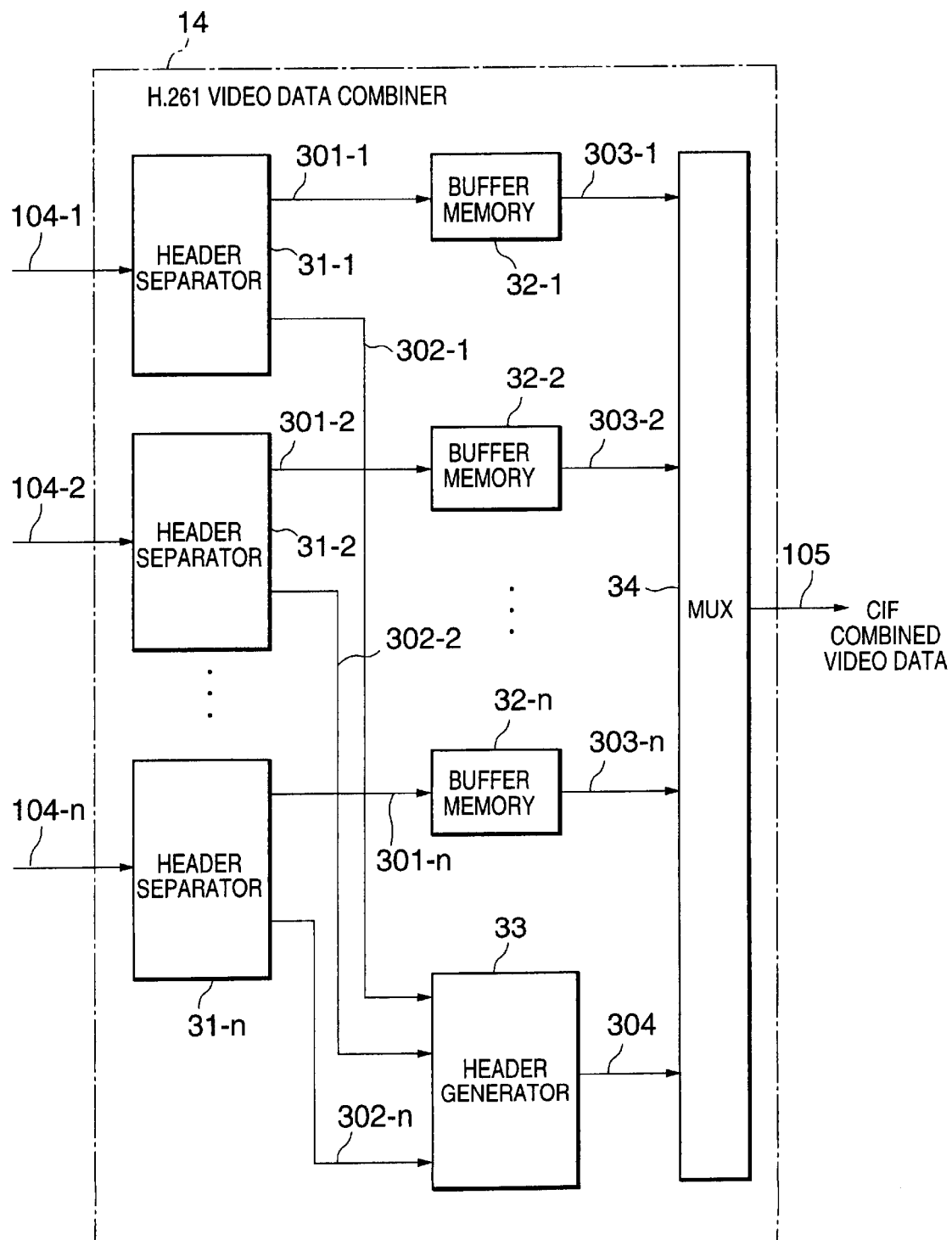
FIG. 3 is a block diagram showing a video data combiner used in the embodiment.

Referring to FIG. 3, the video data combiner 14 includes header separators 31-1 through 31-n, buffer memories 32-1 through 32-n, a header generator 33, and a multiplexer 34.

The respective header separators 31-1 through 31-n separate the QCIF video data 104-1 through 104-n into QCIF video data 301-1 through 301-n and picture, GOB (Group Of Block) and MB (Macro Block) headers 302-1 through 302-n. The QCIF video data 301-1 through 301-n are temporarily stored Into the buffer memories 32-1 through 32-n, respectively. The separated header data are output from the header separators 31-1 through 31-n to the header combiner 33.

The header generator 33 generates Picture. GOB, and MB headers depending on the CIF video data combined by the multiplexer 34 to output combined header data 304 to the multiplexer 34.

The multiplexer 34 reads out QCIF video data 303-1 through 303-n from respective ones of the buffer memories 32-1 through 32-n to combine them. The combined QCIF video data is further multiplexed with the combined header data 304 to produce a frame of CIF combined video data 105.

The circuits other than the video separators 13-1 through 13-n and the video data combiner 14 are well known in the art and therefore their details are omitted. The details of the other circuits are described in ITU-T H.231, H.221 (Frame Structure for a 64 to 1920 kbit/s Channel in Audiovisual Teleservices),and H.261 (Video codecs for audiovisual services at p×64 Kbps).

Picture Combining Operation

A picture combining operation performed by the video separators 13-1 through 13-n and the video data combiner 14 will be described by referring to FIGS. 4A–4I.

Figure 4:
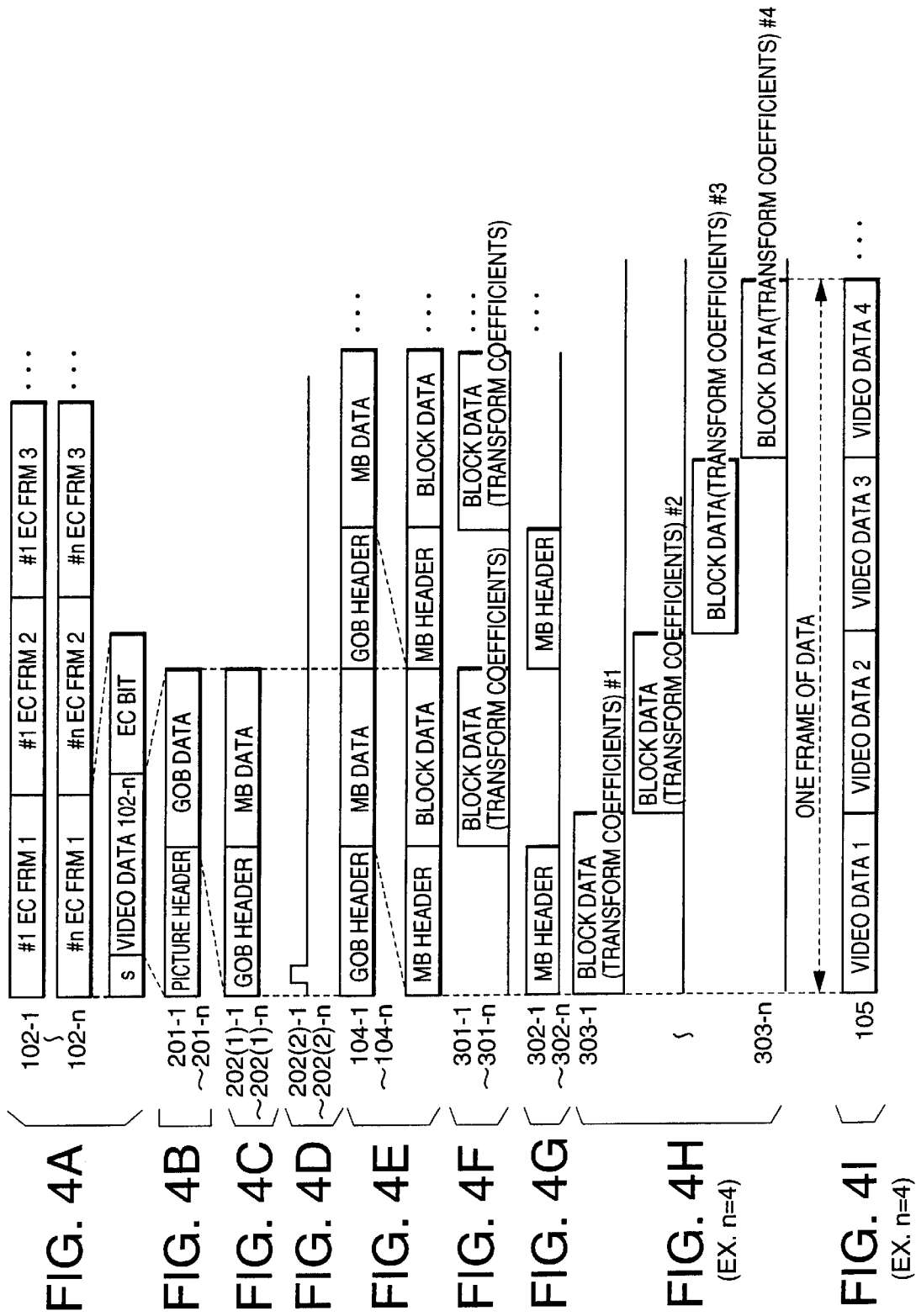
FIG. 4A is a time chart showing H.261 video data for each videoconference terminal.
FIG. 4B is a diagram showing a format of QCIF video data.
FIG. 4C is a diagram showing a format of intra video data.
FIG. 4D is a diagram showing a frame memory update signal.
FIG. 4E is a time chart showing frames of QCIF video data stored in a frame buffer memory.
FIG. 4F is a time chart showing block data separated from frames of QCIF video data.
FIG. 4G is a time chart showing header data separated from frames of QCIF video data.
FIG. 4H is a time chart showing block data stored in buffer memories.
FIG. 4I is a time chart showing H.261 CIF video data attached with combined header data.

As shown in FIG. 4A, each of the video data 102-1 through 102-n includes a video data field and an error-correcting bit field. The respective the video data 102-1 through 102-n output from the data MUX 12 are decoded by the H.261 error-correcting decoders 21-1 through 21-n to produce decoded QCIF video data 201-1 through 201-n, each of which is composed of picture header and GOB data as shown in FIGS. 4B and 4C.

Each of the intra video data separators 22-1 through 22-n detects a type information bit from the picture header and determines whether this picture is an intra frame. When this picture is an intra frame, the respective intra-video data separators 22-1 through 22-n separate intra-QCIF video data 202(1)-1 through 202(1)-n from the decoded video data 201-1 through 201-n into and produces frame memory update signals 202(2)-1 through 202(2)-n as shown in FIGS. 4B–4D.

For example, if the third bit of the type information bit in a picture header is in ON state indicating "picture freeze release", then it is determined that the GOB data following the picture header is an infra frame. The details are described in ITU-T H.261 and H.230 (Frame-synchronous Control and Indication Signals for Audiovisual Systems).

The intra-QCIF video data 202(1)-1 through 202(1)-n are stored into the frame buffer memories 23-1 through 23-n, respectively, and are updated according to the frame memory update signal 202(2)-1 through 202(2)-n, respectively. The respective frames of intra-QCIF video data stored in the frame buffer memories 23-1 through 23-n are output as intra-frame QCIF video data 104-1 through 104-n to the bide data combiner 14 as shown in FIG. 4E.

The respective header separators 31-1 through 31-n separate the QCIF video data 104-1 through 104-n into QCIF video data 301-1 through 301-n as shown in FIG. 4F and header data 302-1 through 302-n as shown in FIG. 4G. Each of the QCIF video data 301-1 through 301-n is composed of transform coefficient data such as DCT coefficients. The QCIF video data 301-1 through 301-n are temporarily stored into the buffer memories 32-1 through 32-n, respectively. The separated header data 302-1 through 302-n are output to the header combiner 33.

Taking n=4 as an example, the multiplexer 34 reads out the QCIF video data 303-1 through 303-4 from respective ones of the buffer memories 32-1 through 32-4 according to such a timing that they are formed into a frame as shown in FIG. 4H. And, the multiplexer 34 further multiplexes the combined video data with the combined header data 304 to produce a frame of H.261 CIF video data 105 as shown in FIG. 4I.

Figure 5:
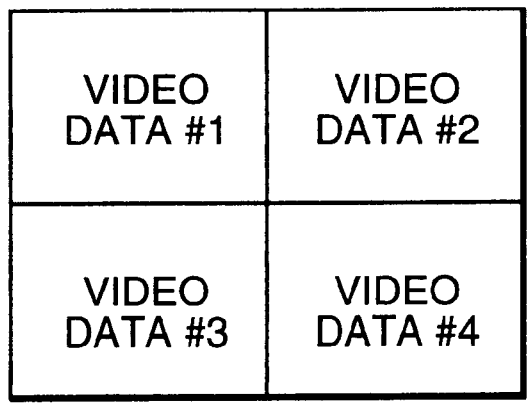
FIG. 5 is a diagram showing display screen partitioned into four portions, which is obtained from the H.261 CIF video data as shown in FIG. 4I.

In this manner, as shown in FIG. 5, the H.261 CIF video data 105 is transmitted to each videoconference terminal. Each participant is provided with a partitioned still display screen separate portions corresponding to individual videoconference terminals.

As described above, since only intra-frame QCIF video data is extracted from the H.261 QCIF video data for each videoconference terminal, a frame of combined H.261 CIF video data can be formed from the extracted intra-frame QCIF video data without the need of H.261 video data decoders conforming to H.261 (Video codecs for audiovisual services at p×64 Kbps), resulting in dramatically reduced amount of circuit hardware in the multipoint control unit. Since only intra frames are used, a smoothly moving picture cannot be displayed but still pictures, each of which is divided into portions corresponding to individual videoconference terminals on each videoconference terminal.

What is claimed is:

1. An apparatus for generating a combined picture data signal in a multipoint control unit of a videoconference system having a plurality of videoconference terminals, in which the combined picture data signal provides each of the plurality of videoconference terminals with a partitioned display screen having separate portions corresponding to respective ones of the plurality of videoconference terminals, comprising:
an extractor for extracting an intra-frame coding picture from each of terminal picture data signals received from the videoconference terminals, wherein the extractor includes:
an intra-frame separator for separating an intra-frame coding picture from each of the plurality of picture data signals by detecting a picture frame followed by the intra-frame coding picture from each one of the plurality of picture data signals; and
a combiner for combining intra-frame coding pictures extracted from the terminal picture data signals to produce the combined picture data signal.

2. The apparatus according to claim 1, wherein the extractor further includes a frame memory for storing the intra-frame coding picture, which is updated every time a picture frame is detected.

3. The apparatus according to claim 1, wherein the combiner comprises:
a header separator for separating each of the plurality of picture data signals into corresponding intra-frame video data and header data;
a header generator for generating combined header data based on header data from the plurality of picture data signals; and
a multiplexer for multiplying intra-frame video data of the plurality of picture data signals and the combined header data to produce the combined picture data signal.

4. The apparatus according to claim 1, wherein each of the plurality of videoconference terminals conforms to ITU-T H-320 standard (Narrow-band Visual Telephone Systems and Terminal Equipment).

5. The apparatus according to claim 1, wherein the intra-frame coding picture is a frame of QCIF (Quarter Common Intermediate Format) video data.

6. A method for generating a combined picture data signal in multipoint control unit of a videoconference system having a plurality of videoconference terminals, in which the combined picture data signal provides each of the plurality of videoconference terminals with a partitioned display screen having separate portions corresponding to respective ones of the plurality of videoconference terminals, comprising:
extracting an intra-frame coding picture from each of a plurality of picture data signals received from each of a corresponding one of the plurality of videoconference terminals, wherein extracting includes:
separating an intra-frame coding picture from each of the plurality of picture data signals by detecting a picture frame followed by the intra-frame coding picture from each one of the plurality of picture data signals; and
combining a plurality of intra-frame coding pictures extracted from each of the plurality of picture data signals to produce the combined picture data signal.

7. The method according to claim 6, wherein extracting further includes storing the intra-frame coding picture, which is updated every time a picture frame is detected.

8. The method according to claim 6, wherein combining a plurality of intra-frame coding pictures includes:
separating each of the plurality of picture data signals into corresponding intraframe video data and header data;

generating combined header data based on header data from the plurality of picture data signals; and multiplexing intra-frame video data of the plurality of picture data signals and the combined header data to produce the combined picture data signal.

9. The method according to claim 6, wherein each of the plurality of videoconference terminals conforms to a ITU-T H.320 standard (Narrow-band Visual Telephone Systems and Terminal Equipment).

10. The method according to claim 6, wherein the intra-frame coding picture comprises a frame of QCIF (Quarter Common Intermediate Format) video data.

* * * * *